United States Patent [19]
Norton

[11] Patent Number: 4,585,026
[45] Date of Patent: Apr. 29, 1986

[54] SEAL FOR COUPLING OR VALVE ASSEMBLIES

[75] Inventor: Jack R. Norton, Elyria, Ohio

[73] Assignee: Lear Siegler, Inc., Elyria, Ohio

[21] Appl. No.: 202,306

[22] Filed: Oct. 30, 1980

[51] Int. Cl.$^4$ ............. F16K 15/03; F16K 25/00; F16J 15/48
[52] U.S. Cl. ............. 137/512.1; 251/212; 251/298; 251/900; 277/212 C
[58] Field of Search ......... 251/212, 298, 299, DIG. 1; 277/207 R, 200, 205, 212 C; 137/512.1

[56] References Cited

U.S. PATENT DOCUMENTS

| | | | |
|---|---|---|---|
| 1,659,880 | 2/1928 | Kauffman | 251/212 |
| 2,159,540 | 5/1939 | MacClatchie | 251/212 |
| 2,560,308 | 7/1951 | Spraragen | 20/69 |
| 2,655,698 | 10/1953 | Chilik et al. | 20/69 |
| 2,934,902 | 5/1960 | Anderson | 251/298 |
| 2,963,754 | 12/1960 | Herman | 20/69 |
| 3,241,568 | 3/1966 | Mayo, Jr. | 251/298 |
| 3,554,567 | 1/1971 | Carroll et al. | 277/200 |
| 3,592,240 | 7/1971 | Hedrick et al. | 251/212 |
| 3,645,547 | 2/1972 | Glover | 277/207 R |
| 3,729,021 | 4/1973 | Humphrey | 251/DIG. 1 |
| 3,847,373 | 11/1974 | Hagar | 251/298 |
| 3,865,386 | 2/1975 | Wilke | 277/207 R |
| 4,073,473 | 2/1978 | Rihm et al. | 251/298 |

FOREIGN PATENT DOCUMENTS

| | | | |
|---|---|---|---|
| 616199 | 3/1961 | Canada | 251/DIG. 1 |
| 687579 | 5/1964 | Canada | 251/298 |
| 4313911 | 3/1964 | Japan | 251/212 |

Primary Examiner—Alan Cohan
Assistant Examiner—John A. Rivell
Attorney, Agent, or Firm—Renner, Otto, Boisselle & Lyon

[57] ABSTRACT

A seal for coupling or valve assemblies employing flapper valves or the like has two axially and radially offset annular sealing members that are integrally joined by a relatively thin folding web section that provides the necessary flexibility to the seal. The radially outer sealing member is adapted to be clamped by a valve plate to the coupling or valve assembly housing to provide a first static seal surrounding the flow passage in the housing, whereas the radially inner sealing member essentially floats at the axial inner end of the web. The radially inner sealing member is adapted to be engaged by the flapper valve when moved to the closed position to provide a second static seal at the flapper valve face preventing flow through the coupling or valve assembly in either direction. Due to the flexibility of the seal, the sealing member will take up any small amount of tolerance conditions and will follow the location and contour of the flapper valve to provide the required sealing function under adverse tolerance conditions.

27 Claims, 6 Drawing Figures

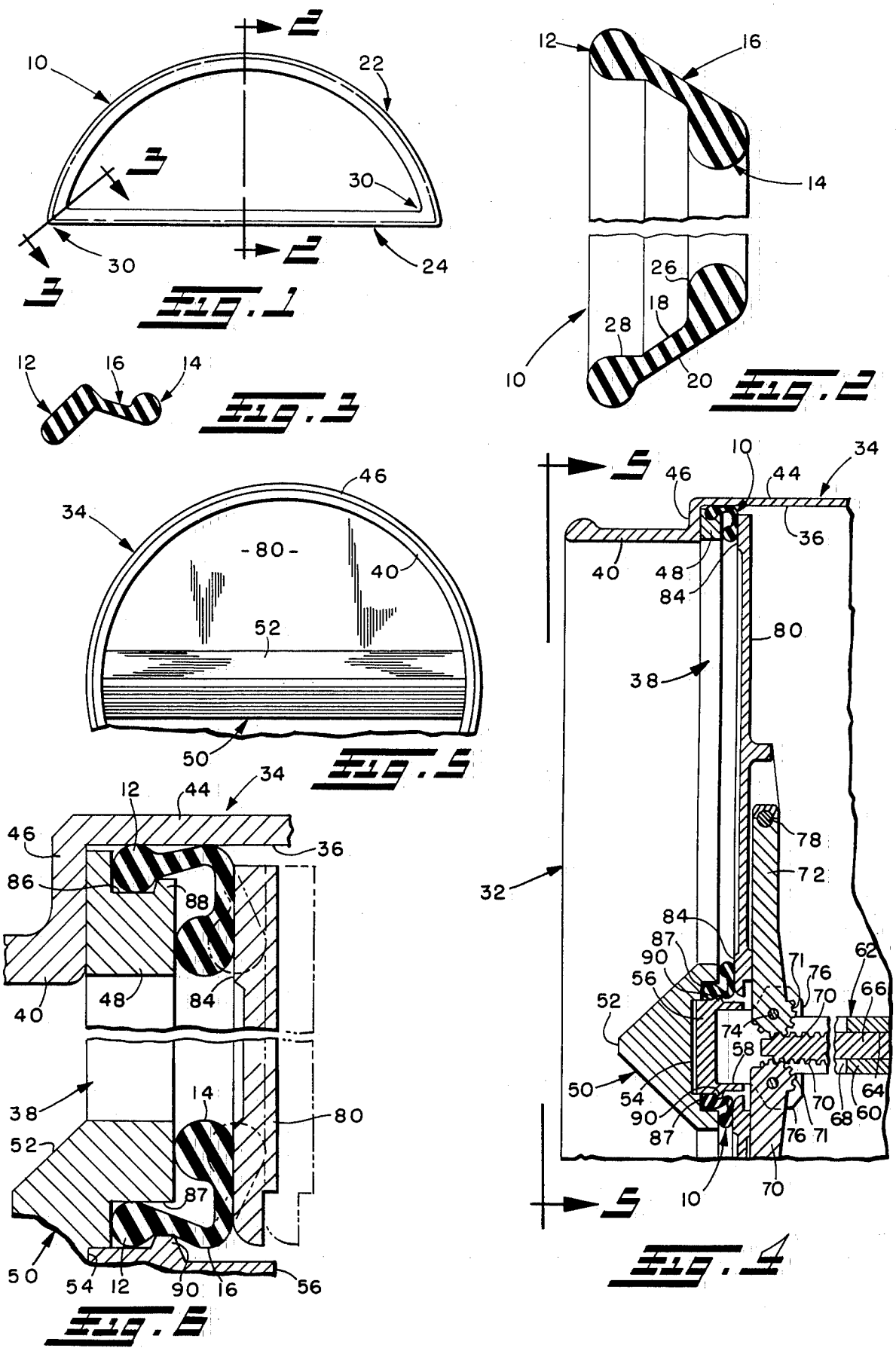

SEAL FOR COUPLING OR VALVE ASSEMBLIES

DISCLOSURE

This invention relates generally to coupling and valve seals and to coupling or valve assemblies employing such seals. More particularly, the invention relates to a novel seal construction and its use in an air purge coupling including a flapper valve that takes up any small amount of tolerance conditions and follows the location and contour of the flapper valve to provide a sealing function in either direction of air flow under adverse tolerance conditions.

BACKGROUND OF THE INVENTION

As noted above, the invention particularly is concerned with a novel seal construction and its use in an air purge coupling such as utilized in the "Space Shuttle" vehicle presently being developed for the United States Government. Such air purge couplings provide purged air to various areas of the vehicle prior to launch. Vents in the sides of the vehicle open to let the stale air out as the new or purged air enters the vehicle through the purge couplings.

Once the vehicle is launched, the air purge couplings close, and remain closed and locked throughout the entire vehicle flight. When closed, the purge couplings are required to seal in either direction of air flow. Such area inside the vehicle ultimately is evacuated of air during flight, since as the vehicle ascends, the vents open now and then to equalize the pressure inside to outside the vehicle until finally all the air inside the vehicle is exhausted.

SUMMARY OF THE INVENTION

With the foregoing in mind, it is a principal object of this invention to provide a seal that is capable of sealing the aforementioned air purge coupling against flow in either direction when the valve is closed.

Another object is to provide such a seal that has the flexibility to move with the flapper valve of the coupling and provide sealing while making up any tolerance conditions in the valve assemblies.

Still another object is to eliminate in such couplings or the like the necessity of precisely fitting components to reduce valve play while still providing an effective seal.

These and other objects of the present invention may be obtained by employing a novel seal construction having two axially and radially offset annular sealing members that are integrally joined by a relatively thin annular folding web. The coupling or valve assembly in which the seal is designed to perform the required sealing function includes a valve housing having a passage therein. The annular seal surrounds such passage with its radially outer sealing member in sealing engagement with the housing. The radially inner sealing member, on the other hand, essentially floats at the axial inner end of the web and is adapted to be engaged by an axially movable flapper valve in the coupling or valve assembly when moved to the closed position to provide a second static seal at the flapper valve face preventing air flow through the coupling in either direction. As the valve closes, the web flexes to take up any small amount of tolerance conditions and follow the location and contour of the flapper valve, thereby maintaining such second static seal while accommodating any adverse tolerance conditions. Accordingly, very precisely fitting coupling or valve assembly components are unnecessary for effective closure of the passage.

To the accomplishment of the foregoing and related ends, the invention, then, comprises the features hereinafter more fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawing:

FIG. 1 is a plan view of a preferred form of seal according to the invention;

FIG. 2 is an enlarged fragmentary vertical section through the seal of FIG. 1, taken along the line 2—2 thereof;

FIG. 3 is a smaller section through one of the corners of the seal, taken along the line 3—3 thereof;

FIG. 4 is a fragmentary vertical section through an air purge coupling showing the seal of FIG. 1 installed therein;

FIG. 5 is a fragmentary plan view of the air purge coupling of FIG. 4, as seen from the line 5—5 thereof; and FIG. 6 is an enlargement of a portion of the air purge coupling of FIG. 4, showing two positions of the flapper valve and seal in solid and phantom lines, respectively.

DETAILED DESCRIPTION OF THE PREFERRED EMBODIMENT

Referring now in detail to the drawing, and intially to FIGS. 1-2, a preferred form of seal according to the subject invention is designated generally by reference numeral 10. The illustrated form of seal 10 is intended for use in an air purge coupling of the type referred to above and is shown as having a generally D-shape annular configuration. For such application, the seal preferably is made of a suitable material such as molded silicone rubber having a Shore A durometer hardness of about 60. However, it should be understood that the seal may have other applicatons in other and different types of coupling and valve assemblies than that particularly described herein, and accordingly may take other configurations and be made of other suitable materials depending upon its particular application.

As best seen in FIG. 2, the seal 10 comprises two axially and radially offset sealing members 12 and 14 that are integrally joined by a relatively thin annular folding web 16. The web 16 has radially inner and outer surfaces 18 and 20 that are substantially parallel at any radial section and inclined to the axis of the seal. The preferred angular inclination of the surfaces 18 and 20 to the seal axis is about 28°. The web 16 includes a generally arcuate portion 22 and a straight or diametrical portion 24 defining the generally D-shape annular configuration of the seal illustrated in FIG. 1.

Still referring to FIG. 2, the outer surface 20 of the web 16, at its radially inner end, forms a straight tangential continuation of the radially inner sealing member 14 which is generally circular in cross-section. At its radially outer end, the outer surface 20 of the web curves radially outwardly until it tangentially joins the reversely curving surface of the outer sealing member 12, which also is generally circular in cross-section.

The inner surface 18 of the web 16, at its radially inner end, curves radially inwardly until it tangentially joins a radially extending surface 26. Such radially extending surface 26 terminates generally in axial alignment with the center of the inner sealing member 14 where it tangentially joins the curved surface of the inner sealing member. At its radially outer end, the radially inner surface 18 of the web terminates at an axially extending surface 28. Such axially extending surface 28 terminates generally in radial alignment with the center of the outer sealing member 12 where it tangentially joins the curved surface of the outer sealing member.

Preferably, the inner sealing member 14 is slightly larger in cross-section than the outer sealing member 12, while the web 16 has a thickness slightly less than the radial dimension of the smaller of the two sealing members, such web being relatively thin and long with respect to the diametric dimensions of the sealing members. As seen in FIG. 2, such dimensions and the configurations of the seal give it a cross-sectional shape that generally can be described as a "dog bone" shape.

The seal 10 generally has the cross-sectional configuration seen in FIG. 2 substantially throughout its annular length. However, the seal at the corners 30 where the arcuate portion 22 and diametrical portion 24 thereof join, preferably has the slightly modified cross-sectional shape seen in FIG. 3. That is, the outer sealing member 12 is radially elongated while its axial dimension is essentially the same as at any other radial section of the seal. Such radial elongation occurs gradually at the corners 30 with the circular cross-sectional shape of the outer sealing member 12 seen in FIG. 2 gradually blending into the radially elongated shape seen in FIG. 3. At the corners 30, the web 16 and inner sealing member 14 generally have the same cross-sectional shape as at any other radial section.

Referring now to FIGS. 4–6, the seal 10 can be seen in its preferred application in an air purge coupling 32. The purge coupling 32 includes a valve housing 34 with a passage 36 therein. The passage 36 is generally circular in cross-section and opens at 38 to an exterior end of the housing that is provided with a tubular coupling flange 40.

The tubular coupling flange 40 may be integrally formed with the valve housing 34 and is radially inwardly offset from the outer circular wall 44 of the housing by a radially extending shoulder 46 as shown. The shoulder 46 provides a stop surface for the annular rim 48 of a valve plate 50 secured in the housing 34 at the opening 38. The valve plate 50 preferably includes two such semi-circular rims 48 that extend in opposite directions from a centrally located nose member 52 that runs diametrically across the opening 38, thereby partitioning such opening into two halves.

The nose member 52 has in its axially inner side a diametrical channel 54 which fits over an insert 56 in the valve housing 34 that extends diametrically across the opening 38. The insert 56 has a centrally disposed axially inwardly opening bore 58 that has fitted therein one end of an axially extending tubular sleeve 60 of a valve actuator assembly 62. The sleeve 60 is secured at its other end to the valve housing 34 and has a central bore 64 in which an actuator rod 66 is axially slidable. The sleeve 60 also has a diametrical slot 68 that extends perpendicularly to the insert 56 and nose member 52. The slot exposes opposite sides of the end of the actuator rod 66 on which are provided a plurality of teeth to form oppositely disposed racks 70. The racks 70 are adapted to engage pinions 71 formed at the radially inner ends of flapper valve pivot arms 72 which extend radially in opposite directions. Each pivot arm 72 is mounted for pivotal movement about its radially inner end on the sleeve 60 as by a pin 74 secured between spaced apart projections 76 on the sleeve 60. At its radially outer end each pivot arm 72 has pivotally mounted thereon as by a pin 78 a flapper valve 80. As seen in FIGS. 4 and 5, each flapper valve 80 is generally in the form of a semi-ciruclar plate, which closes off the portion of the coupling opening 38 with which it is associated when moved to the closed position.

The pinion 71 at the radially inner end of each pivot arm 72 is in cooperative engagement with its corresponding rack 70 so that the flapper valves are moved axially simultaneously between open and closed positions as by moving the actuator rod 66 axially in opposite directions with respect to the sleeve 60. The flapper valves may also be locked in the closed position by moving the actuator rod 66 axially inwardly and locking the same against axial movement. When closed, the substantially flat radially extending sealing surface 84 of each flapper valve engages and seats against the corresponding seal 10 to provide sealing of low pressure air or gaseous nirogen in either direction of air flow in the manner described hereafter.

As best seen in FIGS. 4 and 6, the outer sealing member 12 of each seal 10 is secured in housing 34 by means of the valve plate 50 which has an annular peripheral groove 86 in the radially outer edge of each rim 48 for receipt of the arcuate portion 22 of the outer sealing member 12 and a substantially straight groove 87 in the axially inner side of the nose member 52 at each side of the channel 54 for receipt of the straight portion 24 of the outer sealing member.

The groove 86 in each rim 48 is partially axially closed by means of a radially extending lip 88 which serves to hold the arcuate portion 22 of the outer sealing member 12 in the groove and in sealing contact with the radially inner surface of the housing wall 44. The groove 86 is dimensioned so that the arcuate sealing member portion, when installed in the groove, is maintained in compression, thereby effecting a static seal between the valve plate 50 and housing wall 44.

As seen at the bottom of FIG. 6, the diametrical portion 24 of the sealing member 12 is retained in the groove 87 in sealing engagement with the valve plate 50 to provide a static seal therewith by the insert 56 and the small radially outwardly extending lip 90 thereon which create an axial cross-sectional squeeze on the sealing member. At the union of the nose member 52 and rim 48 of the valve plate, the grooves 86 and 87 in the valve plate may be radially enlarged to accommodate the radially extending portions of the outer sealing member 12 at the corners 30 of the seal.

With the outer sealing member 12 secured in the housing 34 as thus described, the radially inner sealing member 14 extends both axially and radially inwardly into the passage 36 and essentially floats at the end of the web 16. When the inner sealing member 14 is engaged by the flapper valve 80, the web 16 folds upon itself and urges the inner sealing member into sealing engagement with the flapper valve face 84 thus providing a second static seal that prevents flow through the passage 36 in either direction. Because of the relatively long folding web, the inner sealing member will conform to the location and contour of the flapper valve face and move with the flapper valve when in its closed position to maintain the seal while accommodating any flapper valve play that may exist.

As illustrated in FIG. 6, sealed engagement between the seal 10 and flapper valve 80 is maintained notwithstanding limited movement of the latter between the solid line position and the phantom line position. The seal 10 has sufficient flexibility that the sealing member will take up any small amount of tolerance conditions and will follow the location and contour of the flapper valve when closed to provide the required sealing function under adverse tolerance conditions.

From the foregoing, it can be seen that there is provided a novel seal 10 that is capable of sealing against flow in either direction in a coupling or valve assembly and that can accommodate adverse tolerance conditions.

Although the invention has been shown and described with respect to a certain preferred embodiment, it is obvious that equivalent alterations and modifications will occur to others skilled in the art upon the reading and understanding of the specification. The subject invention includes all such equivalent alterations and modifications, and is limited only by the scope of the following claims.

The embodiments of the invention in which an exclusive property or privilege is claimed are defined as follows:

1. A seal comprising two radially and axially offset annular sealing members and a relatively long annular folding web integrally joining said sealing members, said web having radially inner and outer parallel surfaces that are inclined to the axis of said seal, said sealing members being substantially circular in cross-sectional shape, and the radially outer surface of said web at its radially inner end forming a substantially straight tangential continuation of the curved outer surface of the radially inner one of said sealing members.

2. The seal of claim 1 wherein said radially outer surface of said web at its radially outer end curves radially outwardly and tangentially joins the curved outer surface of the radially outer one of said sealing members.

3. The seal of claim 1 wherein said radially inner surface of said web at its radially inner end curves radially inwardly and tangentially joins a radially extending surface tangentially joining the curved outer surface of said radially inner sealing member.

4. The seal of claim 3 wherein the radially inner end of said radially extending surface terminates in substantially axial alignment with the center of said radially inner sealing member.

5. The seal of claim 3 wherein the radial outer end of said radially inner surface terminates at an axially extending surface which tangentially joins the curved outer surface of said radially outer sealing member.

6. The seal of claim 5 wherein said axially extending surface terminates in generally radial alignment with the center of said radially outer sealing member.

7. The seal of claim 1 wherein said radially inner sealing member is slightly larger in cross-section then said radially outer sealing member.

8. The seal of claim 7 wherein said web has a thickness slightly less than the radial dimension of said radially outer sealing member.

9. The seal of claim 7 wherein said web has a length greater than the diameter of said radially inner sealing member.

10. The seal of claim 1 wherein the angular relation of said web to the seal axis is approximately 28°.

11. The seal of claim 1 wherein said seal has a generally D-shape configuration including a generally arcuate portion and a diametrical portion extending between the ends of said arcuate portion.

12. The seal of claim 11 wherein said seal is made of silicone rubber.

13. A coupling or the like comprising a housing having a passage therein, an annular seal in said housing surrounding said passage, said seal including two radially and axially offset annular sealing members and a relatively long annular folding web integrally joining said sealing members, said web having radially inner and outer parallel surfaces which when in the relaxed condition are inclined to the axis of said seal, said sealing members being substantially circular in cross-sectional shape, the radially outer surface of said web at its radially inner end forming a substantially straight tangential continuation of the curved outer surface of the radially inner one of said sealing members, means for retaining the radially outer one of said sealing members in sealed engagement with said housing, and valve means movable into sealing engagement with said radially inner sealing member for closing said passage, said valve means having a substantially flat radially extending sealing surface, said web folding upon itself when said radially inner sealing member is engaged by said sealing surface of said valve means to cause the radially outer surface of said web at its radially inner end and said radially inner sealing member to remain in sealing engagement with said sealing surface of said valve means while accommodating any adverse tolerance conditions.

14. The coupling of claim 13 wherein said means for retaining the radially outer one of said sealing members in sealed engagement with said housing comprises a valve plate secured to said housing, said valve plate having a peripheral groove facing radially outwardly, said peripheral groove receiving said radially outer sealing member therein and being dimensioned so that said radially outer sealing member is maintained in compression to create a static seal between said valve plate and the surrounding housing wall, said groove having radially extending lip means which serves to hold said radially outer sealing member in said groove and in sealing contact with said housing wall.

15. The coupling of claim 14 wherein said valve plate includes two semicircular rims extending in opposite directions from a centrally located nose member that runs diametrically across said passage in said housing, each said rim having one of said peripheral grooves facing radially outwardly from the semicircular portions of said rims, and said nose member having a substantially straight groove in the axially inner side thereof, and there are two of said annular seals each including an arcuate portion corresponding in shape to said semicircular rim portions and a diametrical portion overlying said straight groove in said nose member, said radially outer seal member extending around the entire periphery of each of said seals for receipt in the peripheral groove in one of said rims and said straight groove in said nose member, and means for retaining said diametrical seal portions in said straight groove in sealing engagement with said nose member to provide a static seal therewith.

16. The coupling of claim 15 wherein said last-mentioned means comprises an insert in said straight groove between said diametrical seal portions, said insert having a pair of radially outwardly extending lips thereon which develop an axial squeeze on said diametrical seal portions.

17. The coupling of claim 13 wherein said radially outer surface of said web at its radially outer end curves radially outwardly and tangentially joins the curved outer surface of said radially outer sealing member.

18. The coupling of claim 13 wherein said radially inner surface of said web at its radially inner end curves radially inwardly and joins a radially extending surface, and said radially extending surface tangentially joins the curved outer surface of said radially inner sealing member.

19. The coupling of claim 18 wherein the radial inner end of said radially extending surface terminates in substantially axial alignment with the center of said radially inner sealing member.

20. The coupling of claim 18 wherein the radially outer end of said radially inner surface of said web terminates at an axially extending surface which tangentially joins the curved outer surface of said radially outer sealing member.

21. The coupling of claim 20 wherein said axially extending surface terminates in generally radial alignment with the center of said radially outer sealing member.

22. The coupling of claim 13 wherein said radially inner sealing member is slightly larger in cross-section then said radially outer sealing member.

23. The coupling of claim 22 wherein said web has a thickness slightly less than the radial dimension of said radially outer sealing member.

24. The coupling of claim 22 wherein said web has a length greater than the diameter of said radially inner sealing member.

25. The coupling of claim 13 wherein the angular relation of said web to the seal axis is approximately 28°.

26. The coupling of claim 13 wherein said seal has a generally D-shape configuration including a generally arcuate portion and a diametrical portion extending between the ends of said arcuate portion.

27. The coupling of claim 26 wherein said seal is made of silicone rubber.

* * * * *